Figure 1:
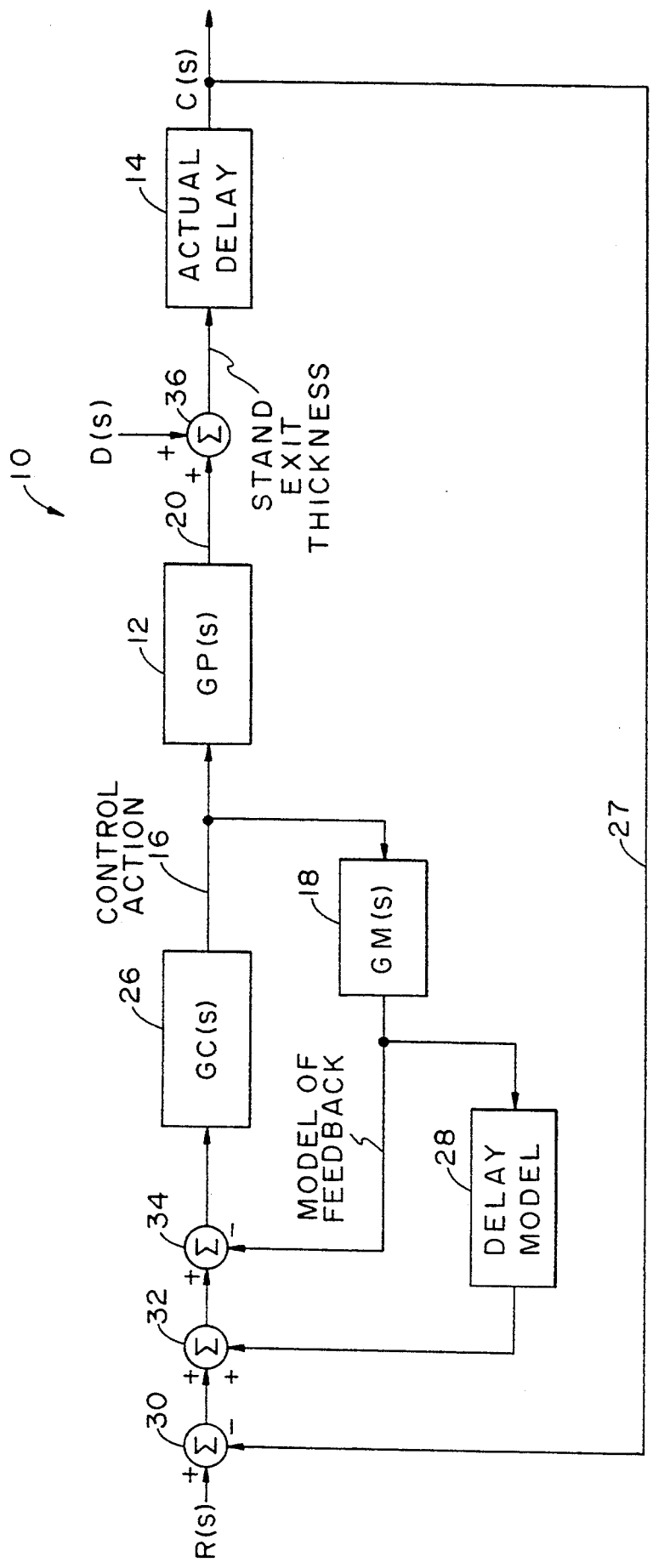

United States Patent [19]

Knapp

[11] Patent Number: 5,341,663

[45] Date of Patent: Aug. 30, 1994

[54] AUTOMATIC PROCESS CONTROL AND NOISE SUPPRESSION

[75] Inventor: David J. Knapp, Knoxville, Tenn.

[73] Assignee: Aluminum Company of America, Pittsburgh, Pa.

[21] Appl. No.: 96,575

[22] Filed: Jul. 23, 1993

Related U.S. Application Data

[63] Continuation of Ser. No. 872,081, Apr. 22, 1992, abandoned.

[51] Int. Cl.$^5$ .................. B21B 37/02; G05B 13/04
[52] U.S. Cl. .......................... 72/8; 364/151; 364/469
[58] Field of Search .............. 72/8, 11, 16; 364/150, 364/151, 152, 161, 164, 165, 469, 472

[56] References Cited

U.S. PATENT DOCUMENTS

| | | | |
|---|---|---|---|
| 4,691,547 | 9/1987 | Teoh et al. | 72/11 |
| 5,043,863 | 8/1991 | Bristol et al. | 364/165 |
| 5,057,993 | 10/1991 | Kanda | 364/150 |
| 5,121,332 | 6/1992 | Balakrishnan et al. | 364/151 |

FOREIGN PATENT DOCUMENTS 0315801 12/1989 Japan ..................... 364/151

Primary Examiner—Lowell A. Larson
Assistant Examiner—Thomas C. Schoeffler
Attorney, Agent, or Firm—Elroy Strickland

[57] ABSTRACT

A method for automatically controlling a nominal property value of a material in the process of making the material, The method includes the steps of providing a feedback model of the process and eliminating the influence of time delay on determining the nominal property value, A state observer is used to estimate at least one unmeasurable variable of the process as a function of at least one measurable variable of the process. The above steps are combined to control the nominal property value as a function of a process variable that is both measurable and undelayed. An actual feedback measurement containing a time delay can be used to correct for any errors that might exist in the feedback estimate.

5 Claims, 3 Drawing Sheets

AUTOMATIC PROCESS CONTROL AND NOISE SUPPRESSION

This application is a continuation, of application Ser. No. 07/872,081, filed Apr. 22, 1992, now abandoned.

BACKGROUND OF THE INVENTION

The present invention relates generally to systems for controlling the parameters of a physical process, such as the gauge of a metal strip being reduced in thickness in a rolling mill, and particularly to a method that substantially eliminates the effect of transport delay of the material in taking corrective action when a disturbance in a nominal value of the material, such as strip gauge, is detected.

Automatic thickness or gauge control systems employed in rolling mills typically use on-line thickness measurement devices located downstream from the exit side of the mill that feed back information on material thickness for effecting corrective control action. The thickness measurement is not generally available at the time the strip leaves the bite of the work rolls of the mill, the measurement being delayed by the amount of time it takes for the strip to travel from the roll bite to the measuring device. In process control terms, the sheet thickness at the exit of the roll bite represents an unmeasurable state or variable.

Hence, one consequence of material transport delay in feedback controllers is that disturbances in the manufacturing process cannot be detected when they occur, and the rate of corrective action is limited because system response to a control action is not known until sometime in the future.

Among the techniques used to deal with linear control systems involving transport delay are the Smith Linear Predictor and "state observers". The former involves the use of a transfer function model GM(s) of the process in a control loop to control process actions. This is shown in FIG. 1 of the present drawings. When a disturbance is detected (still after-the-fact detection), an electrical controller receiving information from the transfer function model can quickly perform the required correction. This is usually fully accomplished before an actual measurement of the manufacturing process becomes available, if one is taken at all. In FIG. 1, the Smith Linear Predictor includes an outer loop by which an actual measured value, when it becomes available, is used to correct for errors that might exist in the transfer function model.

State observers, on the other hand, employ process models to estimate unmeasurable states, such as the gauge of material immediately leaving roll bites, as a function of a measurable value, such as the size of the roll gap of the mill rolling the material. Control action is then based on such an estimate. A recent (Mar. 1990) patent on a state observer employed in rolling mills is U.S. Pat. No. 4,907,434 to Hoshino et al (Sumitomo Light Metals). In addition, a paper on this subject by Hoshino et al was presented at the IFAC World Congress in Munich in Jul. 1987 and published in a journal entitled *Sumitomo Light Metals Technical Report*, Jul. 1987, under the title of "Observer-Based Multivariable Control of the Aluminum Cold Tandem Mill." As will be noted from both the patent and paper, state observer methods typically require detailed process models and can lead to complex sets of equations that must be solved in performing the control function.

As with the Smith Linear Predictor, state estimates of the manufacturing process are correctable when an actual process measurement becomes available.

SUMMARY OF THE INVENTION

The present invention is directed to a high speed method of performing automatic control of a manufacturing process that involves time delays due, for example, to material transport, signal propagation, or off-line measurement. It combines the well-known Smith Linear Predictor for controlling such processes with the concept of the state observer. The method employs measurements of measurable process variables for estimating an unmeasurable variable or one of several known models of a material thickness, in the case of gauge measurement, immediately exiting the roll bite of a roll stand in place of the transfer function GM(s) of the Smith Linear Predictor (in FIG. 1). As indicated earlier, a measurable process variable can be the size of the rolling gap in a rolling stand. An unmeasurable variable is the thickness of a metal strip immediately exiting the stand. Two of the several known models are the gaugemeter and mass flow models, based respectively on the stretch of the housing of a mill stand and the continuity of material flow through the stand. The advantage of both models is that they estimate thickness as a function of process parameters that are both undelayed and measurable, i.e., housing stretch is measurable, based on Hooke's law, and the amount of material moving through the mill is knowable, as it is a constant, i.e., no material is lost in the rolling (thickness reducing) process. As a result, the controller function is capable of instantly detecting thickness deviations at the exit of the roll bite, and since the state observer functions in a manner similar to a linear predictor, control functions are able to quickly correct for changes in material thickness based on modeled feedback. In those cases where an exit gauge measurement is made and is therefore available, the invention permits correction of model errors that may exist.

It is therefore a primary objective of the invention to improve the performance of disturbance rejection in the presence of time delays. This involves a control system capable of detecting thickness disturbances, for example, at the exit of a roll bite, and quickly correcting them, without the benefit of actual measured feedback.

Yet another objective of the invention is to provide performance improvements on mill stands where monitor control, based on actual measured feedback, is employed. Typically, mass-flow and gaugemeter type models are implemented only in stands where a measured feedback is not available, eliminating the possibility of monitor control. This is because such models conflict with the measurement-based schemes due to modeling errors. The intermediate stands of a multistand mill are one such example.

Another objective of the invention is to provide a broad, generalized control method that is not dependent on any specific model of the process under control, i.e., a control method that can accommodate any one of several models for predicting process behavior or the use of an auxiliary measurement, without any model of process behavior.

A further objective of the invention is to provide a system which is compatible with yet other gauge control technology, such as feedforward control systems using entry gauge measurements, and multi-variable control or optimal regulator configurations which address mutual interaction between strip thickness and tension.

Yet another objective of the invention is to provide a scheme that is easily reconfigurable in the case of a sensor failure, the failure adversely affecting the quality of the model of the process variable. In the present invention, straight forward programming is easily performed to provide a "bumpless" transfer from the proposed scheme to the standard Smith Linear Predictor, which employs a transfer function process model, or to conventional control provided, for example, by a proportional-integral (PI) controller. This is also an advantage in the process of commissioning new control systems, as the invention employs algorithms that are quickly made compatible with robust conventional systems.

Yet another object of the invention is to extend the usefulness of the standard Smith Linear Predictor such that process models other than the classical transfer function representation of process responses can be employed to control a manufacturing process. The implementation employs a fast acting high-bandwidth inner control loop and a slower, more accurate outer loop that corrects for model errors.

A further objective of the invention is to reduce the influence of noise in feedback instrumentation on the performance of thickness control. This involves the outer loop of the control mechanism, using actual measurements of the process variable, which outer loop can be detuned in cases where the feedback device has a low signal to noise ratio without affecting the response speed of the model based inner loop.

THE DRAWINGS

Figure 2:
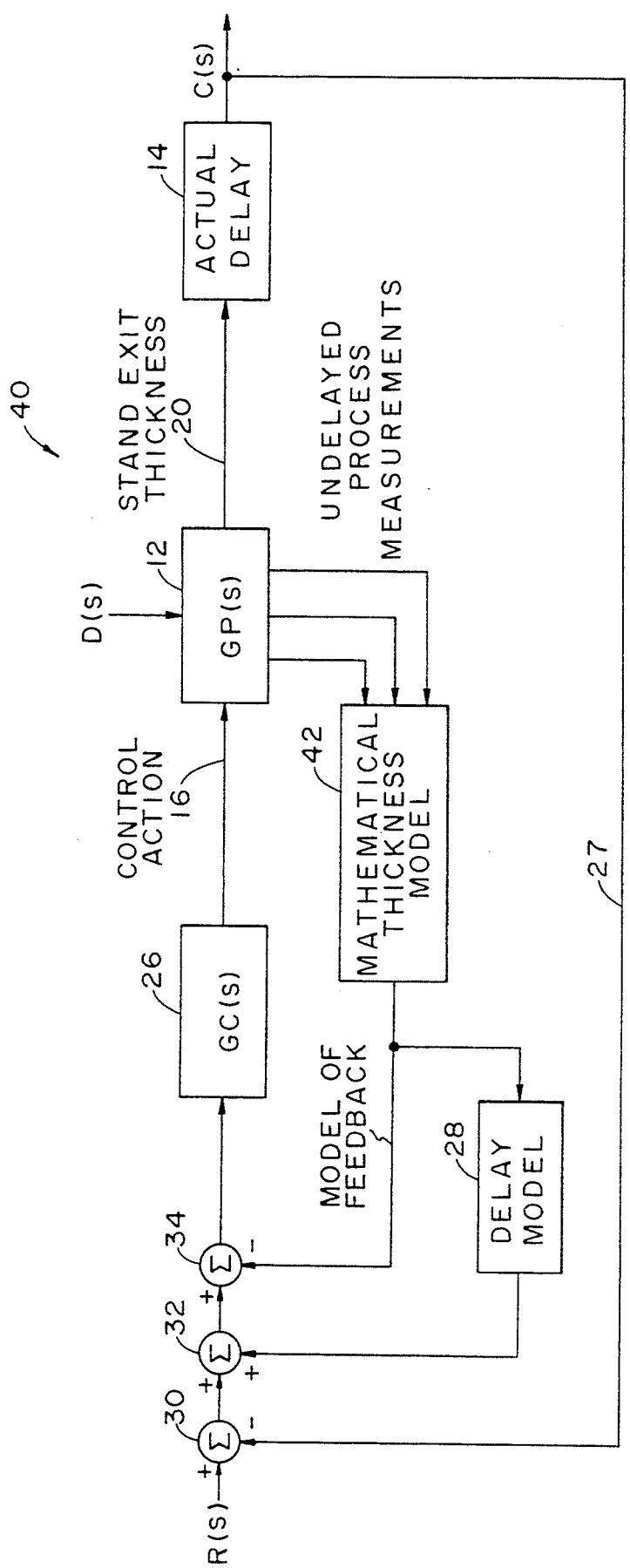
Figure 3:
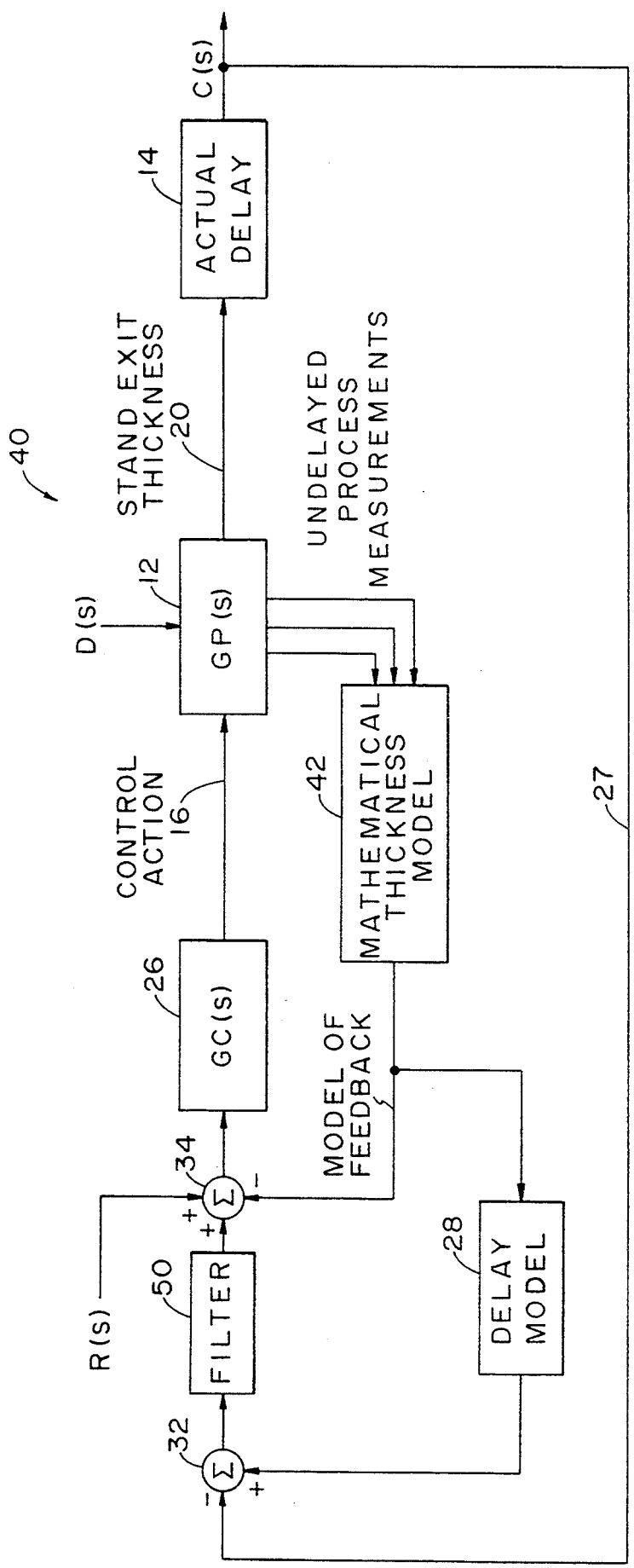

The advantages and objectives of the invention will be better understood from consideration of the following detailed description and the accompanying drawings in which:

Figure 1 is a schematic representation of the standard Smith Linear Predictor, as discussed above;

FIG. 2.is a schematic representation of the control scheme of the invention in which a feedback model of a manufacturing process is combined with a state observer, in the form of a mathematical thickness model, to provide a control action that is unaffected by transport delay; and FIG. 3 is a schematic representation of the control system of the invention in which a modification is included to reduce the influence of noise in a feedback measurement process on the performance of the system.

PREFERRED EMBODIMENT

Referring now to FIG. 1 of the drawings, a Smith Linear Predictor 10 is shown in the form of a flow diagram. The diagram depicts transfer functions in terms of Laplace operator(s) for controlling a nominal property value in a manufacture process (box 12). In this case, the actual measurement of the nominal property value to be controlled takes place downstream of the location of the manufacturing process 12 and is, therefore, delayed in time, as represented by box 14.

The control scheme employs the Laplace-domain transfer function relationship GM(s), as depicted in box 18 between control action 16 and the anticipated process response 20 to these control actions. Therefore, the output of box 18 is an estimate or model of an actual process output 20. The Laplace domain transfer function used in 18 is determined from the linear differential equations that describe the process being controlled at an appropriate operating point.

The Laplace transfer function defines the mathematical relationship between the input and output of a process and is widely used in the analysis and design of control systems. The output of box 18, then, is an estimate of the process output 20 but, unlike an actual measured process output, as identified by C(s), it is undelayed. Therefore, the output of box 18 is the instantaneous modeled feedback signal required by a controller 26 to maintain the nominal property value at or near a reference or target value R(s). The measured output C(s) can be fed back, as provided by 27, to be compared with R(s) in a manner explained hereinafter.

The modeled feedback signal output from 18 is also passed to a delay buffer 28 of a general purpose digital computer (not shown) employed in the control process. This delay buffer models the actual delay 14 of the process being controlled. The delay buffer 28 places the estimated process output signal from 18 in the same time frame as the actual measured process output signal 27 of C(s) which has been delayed at 14. In this way, it becomes possible to compare the estimated process output signal from 18 to the actual measured value C(s) via 27 for purposes of correcting model errors.

If the system of the invention employs a feedback of delayed actual measurement C(s) of the property value being controlled, such as the thickness of metal strip issuing from a roll stand, the measurement is subtracted from the reference value R(s) at a summing junction 30 to produce an error signal. In conventional control systems, this error signal would be passed directly to controller 26. In the Smith Linear Predictor, however, the result of the summation at 30 is passed to a summing junction 32. There it is added to the output of the delay buffer 28 which is the estimated feedback signal from 18, delayed so as to be in the same time frame as the actual measured process output C(s). The result of the summation at 32 is passed to a summing junction 34 where the undelayed estimated feedback signal from 18 is subtracted from it. The result of the summation at 34 consists of the difference between the reference value R(s) and estimated process output signal from 18, corrected for model errors in 18. The correction for model errors is accomplished by including any difference between the actual measured process output C(s) and the estimated value of 18, placed in the proper time frame, in the overall signal sent to controller 26.

The result of the summation at 34 is sent to controller 26 to control the nominal value of the manufacturing process of 12. Controller 26 can be the well-known proportional-integral type where the control action is a function of the magnitude of the controller input signal as well as its time integral. The controller provides a control action that forces a change in the manufacturing process in the direction that eliminates the difference between the reference value R(s) and the actual measured feedback value C(s). The output of the controller 26 is simultaneously passed to the feedback and delay models 18 and 28 respectively in order to provide the controller with up-to-date feedback information. In this way, the output of the controller provides proper correction for disturbances D(s) affecting the dynamics GP(s) of the manufacturing process 12.

The feedback prediction performed at 18 includes only process responses to control actions generated by 26. There is no provision in the Smith Linear Predictor for using information about the disturbances D(s) in a feedforward fashion, though such a function could be performed by an auxiliary feedforward controller (not shown). Therefore, D(s) is depicted in FIG. 1 downstream from the feedback prediction operation 18 and the actual manufacturing process at 12. The output 20 of the manufacturing process 12 is thus shown as being summed at a junction 36 with disturbances D(s) occurring in a nominal property value of the manufacturing process. Such disturbances are detected as differences between the actual measured process output C(s) and the estimated value, placed in the proper time frame, output from the delay buffer 28. These differences alter the result of the summation at 34, causing the controller 26 to force a change in manufacturing process 12 in the direction that eliminates the influence of the disturbance on the process output C(s).

By means of the feedback estimation function performed at 18, the Smith Linear Predictor is able to force a manufacturing process involving delayed feedback to follow changes in the reference value R(s) much faster than conventional systems. Though process disturbances D(s) are still detected after-the-fact, the Smith Linear Predictor can more quickly eliminate their impact on the process parameter to be controlled. This is because the process feedback information required to make the correction is predicted by the transfer function model of the manufacturing process at 18.

FIG. 2 of the drawing shows the automatic process control system of the invention, generally designated by numeral 40, in which transfer functions GM(s) of the Smith Linear Predictor of FIG. 1 are replaced by a mathematical model 42 of a process parameter, such as thickness. The effect of the arrangement in FIG. 2 is a combination of a Smith Linear Predictor and a state observer, but without the transfer functions of the Smith Linear model. The thickness model 42, in the case of automatic gauge control, functions as a "state observer" to provide an estimate of material thickness issuing immediately from the bite of a rolling mill. "Thickness" is the "state" being observed and is not usually measured directly. The estimate is based on a measurable parameter such as the size of a roll gap under actual load, mill housing stretch, or the constant volume flow principle. The actual size of a loaded roll gap can be measured by any of several gap sensing devices (not shown), including: a mechanical feeler gauge situated between the rolls or bearing chocks of a mill, an optical sensor positioned to view the roll gap, a pneumatic sensing device or other such device.

Mill housing stretch is based upon the standard gaugemeter equation:

$$\Delta h = \Delta s + (\Delta F / M) \tag{1}$$

where the $\Delta h$ is a change or disturbance in exit thickness, $\Delta s$ is a change in the position the screws or cylinders of a mill that set the rolling gap, $\Delta F$ is a change in total rolling force, and M is the modulus of elasticity of the mill housing; the fraction $\Delta F/M$ is a measure of the stretch of housing of a mill stand.

In the case of the gaugemeter equation, rolling force is measurable by load cells suitably located within the mill stand; the position of mill screws or cylinders are easily measured by rotating encoders or other suitable means.

The constant volume flow rate principle can be expressed simply by $$G_1 V_1 = G_2 V_2 \tag{2}$$

where $G_1$ is strip entry gauge, $G_2$ is strip exit gauge, $V_1$ is strip speed entering a roll stand, and $V_2$ is strip speed leaving the stand.

An appropriate thickness model can be obtained from Equation (2) by measuring the thickness of material entering a given rolling stand, as well as its entry and exit speeds. Solving Equation (2) for exit thickness produces the desired thickness estimate.

With such measurements available, model 42 is able to instantly estimate the state, i.e., the thickness of the material exiting a mill. This estimate value can then be used in place of the output of 18 in the Smith Linear Predictor of FIG. 1 to further improve performance. In this case, the output of 42 is the instantaneous modeled feedback signal required by the controller 26 to maintain the nominal property value to be controlled at or near the reference value R(s). The result of the summation at 34 is the difference between the reference or target value R(s) and the estimated process output signal from 42, corrected for model errors in 42. The correction for model errors is again accomplished by including any difference between the actual measured process output C(s) and the estimated value, placed in the proper time frame, in the overall control signal.

The functions performed by the components of system 40 in FIG. 2 that are the same as those performed in FIG. 1 bear the same reference numerals.

The result of the summation at 34 is directed to controller 26, as in FIG. 1, to control the nominal value of the manufacturing process. The controller provides a control action that forces a change in the manufacturing process in the direction to eliminate the difference between the reference value R(s) and the actual measurement feedback value C(s). In this way, the output of the controller provides proper correction for disturbances D(s) occurring in the manufacturing process GP(s) at 12.

The feedback prediction performed at 42 (in FIG. 2) differs from that at 18 (in FIG. 1) by employing auxiliary process measurements to estimate the actual value 20 of process 12. The model of 42 includes the effects of any disturbances D(s), as well as control actions 16, acting on the manufacturing process, whereas 18 included only process responses to the control actions generated by 26. Therefore, the manufacturing process in FIG. 2 is depicted as directly involving disturbance D(s).

Such disturbances are detected without delay by the process model 42 and directed to summing junction 34. Thus, controller 26 forces a change in manufacturing process 12 in the direction that eliminates the influence of the disturbance D(s) on the process output C(s) without the intervening delay of the Smith Linear Predictor or more conventional systems.

As in the Smith Linear Predictor, FIG. 2 indicates that an actual measurement value C(s), that occurs after the time delay 14, can be employed to correct for any estimation errors that might occur in the model of 42 by directing the measurement value via 27 to summing junction 30.

By means of the feedback estimation function performed at 42, the invention shown in FIG. 2 exhibits the improved reference following characteristics of the Smith Linear Predictor. In addition, process disturbances D(s) are detected as they occur, without an intervening delay, resulting in considerable disturbance rejection improvements.

The measured feedback 27 in FIGS. 1 and 2 is depicted as an "outer" loop, as opposed to the "inner" loop containing the transfer function GM(s) in FIG. 1 and the thickness model 42 in FIG. 2. The control processes of the outer loop are more accurate than those of the inner loop, as the feedback is an actual measurement of a parameter of the manufacturing process. The outer loop is also, of course, slower since it is delayed by the time of material travel to the location of the measuring means. The inner loops of FIGS. 1 and 2 are high speed since they act quickly on undelayed estimated feedback signals based on measurements made at the location of the manufacturing process.

If the outer loop has a low signal-to-noise ratio, the influence of noise on the outer loop can be reduced by suitable detuning of the outer loop, without affecting the rapid response of the inner loop. One method by which this can be accomplished is shown in FIG. 3, where an appropriate noise suppression filter 50 has been inserted after the summation of 32 but before the summation at 34. If it is desirable to prevent the reference-following performance of the control system from being affected by the filter 50, then the reference signal R(s) can be directed to summing junction 34, as shown in FIG. 3, instead of being directed to summing junction 30 as shown in FIG. 2.

An example of a noise suppression filter for 50 is a first-order lowpass filter which can be used to eliminate high-frequency measurement noise. Since the rapid response of the inner control loop is not altered by the configuration of FIG. 3, the resulting system continues to respond quickly to both reference changes and process disturbances, which are predicted by the process model 42. Model errors, however, which are detected at summing junction 32 in FIG. 3, as differences between the actual measured process output and the estimated value, placed in the proper time frame, are corrected far more slowly. This is because these model errors are acted upon by filter element 50. Thus, the reliability of the outer loop feedback signal with low signal-to-noise ratio is improved without adversely affecting disturbance rejection or the reference-following performance of the system.

While the invention has been described in terms of preferred embodiments, the claims appended hereto are intended to encompass all embodiments which fall within the spirit and scope of the invention.

What is claimed is:

1. A method of controlling a process of making a material to a nominal property value using control configuration of a Smith Linear Predictor which employs an undelayed estimate of the property value, a measurement of the property value in a delayed time frame, and a delay buffer that places said estimate in the time frame of the delayed measurement of said property value, wherein the improvement comprises:
   providing a feedback model of the process that includes a state observer and no transfer function model;
   using said state observer in an undelayed time frame to estimate the property value as a function of at least one measurable variable of the process observed by the state observer to eliminate the influence of transport delay of the material on controlling the process to said nominal property value;
   eliminating any influence of model errors in the state observer on the control process by using a delay buffer that models transport delay in a manner that places said estimate of the property value in the time frame of the delayed measurable variable; and
   using said estimate to control the process to said nominal property value.

2. The method of claim 1 in which the estimate of the property value provides a high speed of response in forcing the process to said nominal property value, the method including the additional step of filtering any noise that may occur in the process in a manner that does not reduce said high speed of response.

3. The method of claim 1 including the step of: measuring the nominal property value of the material at a time after the estimate is made of the property value; and
   using the measured property value to correct any error that might be contained in the estimate made by said state observer.

4. The method of claim 1 in which the property value is the thickness of a material immediately exiting a rolling mill, the method further including:
   providing a model of said material thickness for the state observer selected from the group consisting of gauge meter and mass-flow models based respectively on mill housing stretch and the continuity of material flow through the mill to estimate the thickness of said material immediately exiting the rolling mill.

5. The method of claim 1 in which the property value is the thickness of a material passing through a roll gap of a rolling mill, the method of further including:
   employing a measurement of said roll gap for the state observer.

* * * * *